United States Patent [19]
Amirkiai et al.

[11] Patent Number: 6,028,744
[45] Date of Patent: Feb. 22, 2000

[54] METHOD AND APPARATUS FOR LATCHING AN ACTUATOR ASSEMBLY TO PREVENT DAMAGE TO DISK DRIVE HEADS

[75] Inventors: Maziar Amirkiai, Sunnyvale; Stanley Y. Wong, San Jose; Ali Hosseinzadeh, Fremont, all of Calif.

[73] Assignee: Quantum Corporation, Milpitas, Calif.

[21] Appl. No.: 08/876,467

[22] Filed: Jun. 16, 1997

[51] Int. Cl.⁷ ...................................................... G11B 5/54
[52] U.S. Cl. ............................................................ 360/105
[58] Field of Search ..................................... 360/105, 106

[56] References Cited

U.S. PATENT DOCUMENTS

| | | | |
|---|---|---|---|
| 4,692,829 | 9/1987 | Campbell | 360/105 |
| 5,003,422 | 3/1991 | Sun et al. | 360/105 |
| 5,023,736 | 6/1991 | Kelsic et al. | 360/105 |
| 5,025,335 | 6/1991 | Stefansky | 360/97.01 |
| 5,043,834 | 8/1991 | Kubo et al. | 360/105 |
| 5,208,713 | 5/1993 | Lindsay et al. | 360/105 |
| 5,303,101 | 4/1994 | Hatch et al. | 360/105 |
| 5,319,511 | 6/1994 | Lin | 360/105 |
| 5,341,259 | 8/1994 | Amirkiai et al. | 360/105 |
| 5,363,261 | 11/1994 | Eckberg et al. | 360/105 |
| 5,452,159 | 9/1995 | Stefansky | 360/105 |
| 5,483,399 | 1/1996 | Jeong et al. | 360/105 |
| 5,712,750 | 1/1998 | Kim | 360/105 |
| 5,742,453 | 4/1998 | MacPherson | 360/105 |

*Primary Examiner*—Brian E. Miller
*Attorney, Agent, or Firm*—Hickman Beyer & Weaver; Peggy A. Su; John C. Chen

[57] ABSTRACT

The present invention relates, in one aspect, to an apparatus for positioning a disk drive head over a disk which is a part of a disk drive assembly. A disk drive apparatus includes a base plate, a disk coupled to the base plate, a disk drive head assembly arranged over the disk, and an actuator assembly that is arranged to position the disk drive head assembly over the disk. The actuator assembly is coupled to the disk drive head assembly, and includes a ferrite piece and a crash stop contact point that is separate from the ferrite piece. The disk drive apparatus also includes a magnetic latching assembly which has a plate extension that is substantially stationary with respect to the disk, a magnet nest that is movably mounted over the plate extension, and a latch magnet that is coupled to the magnet nest. A crash stop, which is also included in the disk drive apparatus, is arranged to be contacted by the crash stop contact point when the disk drive head assembly is positioned in a parking position.

10 Claims, 4 Drawing Sheets

METHOD AND APPARATUS FOR LATCHING AN ACTUATOR ASSEMBLY TO PREVENT DAMAGE TO DISK DRIVE HEADS

BACKGROUND OF THE INVENTION

The present invention relates generally to methods and apparatus for use in disk drives for computer systems, and more particularly, to methods and apparatus for preventing damage to disk drive heads by latching an actuator assembly of a disk drive.

Disk drives typically include mechanisms which are arranged to "park" disk drive heads when the disks in the disk drive of a computer system are not in use. Parking a disk drive head entails positioning the disk drive head over a particular section of a disk, and latching an actuator which supports the disk drive head in order to lock the disk drive head in place. As any sudden, abrupt contact between a disk drive head and a disk may result in damage to the disk and, hence, the potential loss of data in the event that the disk drive head abruptly contacts a data-carrying sector of the disk, parking the disk drive head serves to protect the data sectors of the disk. It should be appreciated that the ability to park disk drive heads to prevent sudden contact between the disk drive heads and data sectors of the disk is crucial.

A disk drive head is typically coupled to an actuator assembly. An actuator assembly is arranged to pivot or linearly move the disk drive head to different positions over a disk such that data may be retrieved from different data-carrying sectors of the disk. In general, when a disk drive head is to be moved, force is generated to pivot or move the actuator assembly through the use of a coil structure that is a part of the actuator assembly, and a magnetic field which surrounds the coil structure, as will be appreciated by those skilled in the art. By passing current through the coil structure in a particular direction and for a specified length of time, the actuator assembly may be pivoted such that the disk drive head is positioned over a specific portion of the disk.

The forces associated with parking a disk drive head are often quite substantial. That is, the force that is generated by pivoting or linearly moving the actuator assembly in order to place the disk drive head in a parked position is generally relatively high. A disk drive head parking process during which the actuator assembly is moved with a relatively high force may be considered to be a "hard stop." During a hard stop, shocks to the actuator assembly may cause damage to the disk drive heads. As such, mechanisms are often implemented in disk drives to prevent damage to disk drive heads during parking processes.

One mechanism that is conventionally used to park disk drive heads is a mechanical latch assembly which captures a portion of the actuator assembly. Such a mechanical latch assembly usually involves mechanically capturing the actuator assembly to park the disk drive heads. Although mechanical latch assemblies are effective in holding disk drive heads in a fixed position, the processes of parking and "un-parking" disk drive heads are inefficient, as positioning and repositioning mechanical pieces is relatively time-consuming. In addition, tolerancing a plurality of mechanical parts such that a mechanical latch assembly may function as desired is both difficult and time-consuming.

Another latching mechanism that is often used to park disk drive heads involves solenoids that are arranged to lock an actuator assembly and, therefore, disk drive heads into place. As tolerances associated with placing solenoids with respect to an actuator assembly are relatively easy to meet, solenoids are effective for use in latching actuator assemblies. In addition, the amount of time associated with activating a solenoid to latch an actuator assembly is minimal. However, although solenoids are effective and efficient when used as latching mechanisms, the physical size of solenoids is typically inhibitive. That is, solenoids, as well as associated circuitry which is used to activate and to deactivate the solenoids, consume substantial amounts of space within a disk drive and, as a result, are not always desirable. Further, solenoids are typically expensive, and are, therefore, often impractical for use in high-volume products like disk drives.

Magnetic latches have also been used to lock actuator assemblies. When a magnetic latch is used to lock an actuator assembly, a coil assembly in the actuator assembly is used, in conjunction with a magnetic field generated around the coil assembly, to force a ferrite component, or piece, on the actuator assembly towards a stationary locking magnet. Once the ferrite piece on the actuator assembly is forced towards the locking magnet, magnetic attraction between the ferrite piece on the actuator assembly and the locking magnet causes the two parts to come together, thereby locking the actuator assembly in a stationary position, as will be described with respect to FIG. 1a.

Figure 1A:
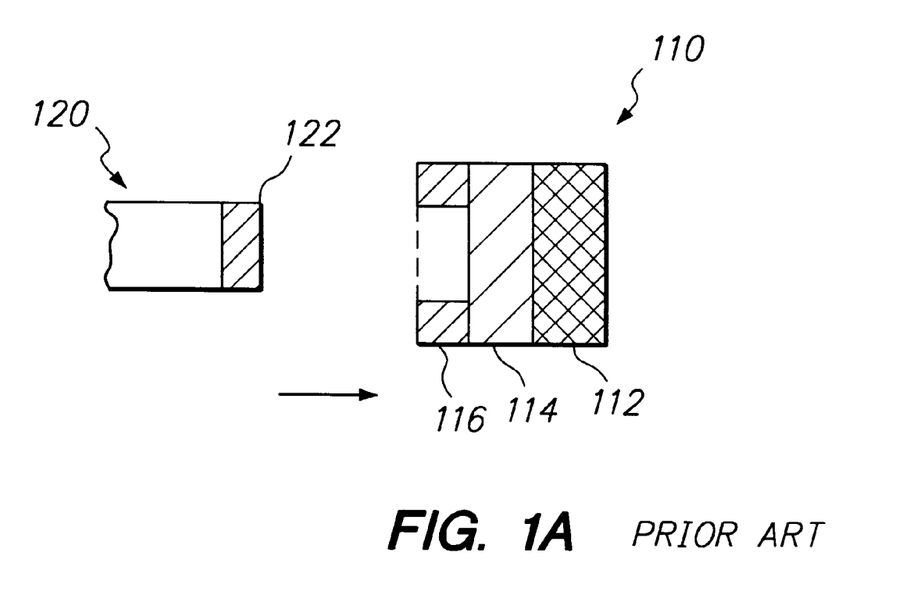
FIG. 1*a* is a diagrammatic representation of a cross-section of a conventional stationary magnet latching structure.

FIG. 1a is a diagrammatic representation of a cross-section of a conventional stationary magnetic latching structure. A stationary magnetic latching structure 110 includes a stationary magnet 112, a rubber pad 114, and an extension of a magnetic steel plate 116. The extension of magnetic plate 116 shunts fringe fields from stationary magnet 112, as will be appreciated by those skilled in the art. The extension of magnetic plate 116 also essentially serves to secure stationary magnet 112, as well as rubber pad 114, with respect to extension of magnetic plate 116.

Rubber pad 114, which is also known as a crash stop, serves to absorb some of the force produced by the contact of an actuator assembly 120 with stationary magnet latching structure 110. When current flows through a coil assembly (not shown) that is associated with actuator assembly 120, an actuator ferrite piece 122 that is attached to actuator assembly 120 is moved towards stationary magnet 112. Once actuator ferrite piece 122 begins to move towards stationary magnet 112, attractive forces between stationary magnet 112 and actuator ferrite piece 122 further propel actuator ferrite piece 122 towards stationary magnet 112.

If actuator ferrite piece 122 and stationary magnet 112 are allowed to latch directly together during a parking process, damage may occur to the disk drive heads, due to the fact that such a direct "collision" between actuator ferrite piece 122 and stationary magnet 112 is, in essence, a physical shock to the disk drive heads. As such, rubber pad 114 is included in stationary magnet latching structure 110 to absorb some of the force associated with the attraction between stationary magnet 112 and actuator ferrite piece 122. Rubber pad 114 briefly compresses when actuator ferrite piece 122 makes contact with rubber pad 114, and expands once actuator ferrite piece 122 settles into a parked position, e.g., an equilibrium position with respect to stationary magnet 112.

In general, the pliant properties of rubber makes the size of rubber pad 114, difficult to control, as forming a rectangular piece of rubber is difficult in light of the properties of rubber. If the size of rubber pad 114 is not properly proportioned, that is, if the size of rubber pad 114 is not appropriate for the force at which actuator ferrite piece 122 is attracted towards stationary magnet 112, damage may occur to disk drive heads either because actuator ferrite piece 122 is improperly latched to stationary magnet 112, or because not enough force is absorbed by rubber pad 114. Further, as rubber pad 114 is typically rectangular in shape, the precise placement of rubber pad 114 in a desired location within an overall disk drive assembly is difficult, as will be appreciated by those skilled in the art. As such, the proper formation and the precise placement of magnetic latching assembly 110 often proves to be unduly time-consuming.

The inclusion of rubber pad 114 on stationary magnet 112 creates an air gap between actuator ferrite piece 122 and stationary magnet 112. It should be appreciated that the air gap is essentially defined by the thickness of rubber pad 114. Such an air gap requires that the magnetic attraction between stationary magnet 112 and actuator ferrite piece 122 be strong enough to permeate the air gap and still hold stationary magnet 112 and actuator ferrite piece 122 together when desired. In general, the impact force between actuator assembly 120 and stationary magnet latching structure 110 increases as the size, i.e., the inertia, of actuator assembly 120 in the overall disk drive increases. As such, the size of rubber pad 114 generally also increases to compensate for the additional impact force which must be absorbed to prevent damage to disk drive heads (not shown).

When the size of rubber pad 114 increases, it follows that the strength of stationary magnet 112 and the size of actuator ferrite piece 122 are typically also increased in order to enable the magnetic attraction between stationary magnet 112 and actuator ferrite piece 122 to pass through the air gap. As a result, the possibility of magnetic fields associated with stationary magnet 112 interfering with other portions of the overall disk drive increases. In general, it should be appreciated that the air gap between stationary magnet 112 and actuator ferrite piece 122 results in the inefficient use of magnetic fields associated with stationary magnet 112. In other words, the magnetic holding force between stationary magnet 112 and actuator ferrite piece 122 is less efficiently used as the size of the air gap increases.

Therefore, what is desired is a method and an apparatus for efficiently and effectively positioning disk drive heads in a parked position within a disk drive assembly without damaging the disk drive heads. Further, what is desired is an efficient method and an apparatus for parking disk drive heads which is inexpensive and relatively easy to implement.

SUMMARY OF THE INVENTION

The present invention relates, in one aspect, to a method for assembling a disk drive. The method includes providing a base plate and coupling a disk to the base plate. An actuator assembly, which is coupled to a disk drive head assembly, is coupled to the base plate. The actuator assembly is arranged to position the disk drive head assembly over the disk, and includes a latch ferrite piece and a crash stop contact point which is separate from the latch ferrite piece. The method further includes coupling a magnetic latching assembly to the base plate. The magnetic latching assembly includes a latch magnet that is movably coupled to the base plate and is arranged to attract the latch ferrite piece. Finally, the method also includes coupling a compressible crash stop to the base plate. The compressible crash stop is arranged to be contacted by the actuator assembly crash stop contact point when the disk drive head assembly is positioned in a parking position. When the disk drive head assembly is positioned in a parking position, the ferrite piece is attracted by the latch magnet.

In one embodiment, coupling the magnetic latching assembly to the base plate includes providing a magnet nest that is arranged to support the latch magnet, and coupling the latch magnet to the magnet nest. In such an embodiment, the magnet nest is movably coupled to the base plate.

In another embodiment, the method for assembling a disk drive includes providing an air lock, and coupling the air lock to the base plate. Such an air lock is arranged to engage the actuator assembly to prevent the actuator assembly from being susceptible to shocks.

According to another aspect of the present invention, a disk drive apparatus includes a base plate, a disk coupled to the base plate, a disk drive head assembly arranged over the disk, and an actuator assembly that is arranged to position the disk drive head assembly over the disk. The actuator assembly is coupled to the disk drive head assembly, and includes a latch ferrite piece and a crash stop contact point that is separate from the latch magnet. The disk drive apparatus also includes a magnetic latching assembly which has a plate extension that is substantially stationary with respect to the disk, a magnet nest that is movably mounted over the plate extension, and a latch magnet that is coupled to the magnet nest. A crash stop, which is also included in the disk drive apparatus, is arranged to be contacted by the actuator crash stop contact point when the disk drive head assembly is positioned in a parking position.

In one embodiment, the crash stop is a cylindrically shaped rubber piece. In another embodiment, the magnet nest is arranged to move with respect to the plate extension when the actuator crash stop contact point first contacts the crash stop and the actuator ferrite piece first contacts the magnet nest. In still another embodiment, an air lock is arranged to prevent the actuator assembly from being susceptible to shocks.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one embodiment of the present invention, a floating magnetic latch used in cooperation with a separate rubber stopper, i.e., a rubber pad which is not attached to the floating magnetic latch, enables an associated disk drive head, which is coupled to an actuator assembly, to be efficiently and effectively parked. The separate rubber stopper is arranged to absorb much of the energy associated with the impact force generated while parking disk drive heads. As such, it is not necessary to design the floating magnetic latch to absorb a relatively large amount of force, due to the fact that the rubber stopper absorbs much of the impact force against the floating magnet. In addition, the floating, non-stationary aspect of the floating magnetic latch further reduces the impact force as compared to the impact force generated when an actuator assembly impacts a rigid, stationary magnet.

The fabrication of a floating magnetic latch, as well as the fabrication of a separate, typically cylindrically shaped, rubber pad, is relatively straightforward. By way of example, fabricating a cylindrically shaped rubber piece and locating the piece with respect to a fixed base, e.g., a disk drive assembly base, is significantly less complex than fabricating and placing a rectangularly shaped rubber piece, due to material properties and design tolerance, as will be appreciated by those skilled in the art.

In addition, by not placing a rubber pad directly on the floating magnetic latch, the air gap formed between a supporting structure, as for example a magnetic plate, and a actuator ferrite piece that is a part of the floating magnetic latch may be substantially minimized. As such, the magnetic holding force between a ferrite piece on the actuator assembly and the floating magnet may be used more efficiently.

Figure 1B:
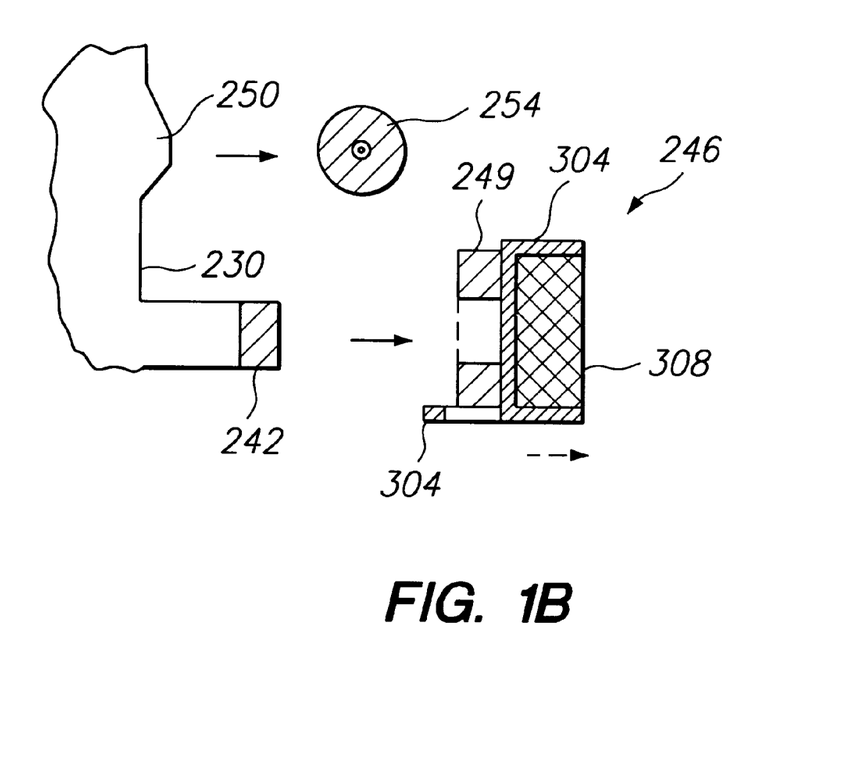
FIG. 1*b* is a diagrammatic representation of a cross-section of a floating magnet latching system in accordance with an embodiment of the present invention.

With reference to FIG. 1b, a floating magnet latching system for a disk drive assembly will be described in accordance with an embodiment of the present invention. It should be appreciated that the cross-section of floating magnet latching system illustrated in FIG. 1b is a schematic illustration that is intended for use in describing the basic functionality of the floating magnet latching system. A representation of one example of an actual floating magnet latching system will be described below with respect to FIGS. 2 and 3.

A floating magnet latching piece 246 includes a latching magnet 308 and a magnet nest 304, which are supported by a magnetic plate, or "magplate," extension 249. Latching magnet 308 is supported by magnet nest 154 which is mounted over magplate extension 249, i.e., magnet nest 304 is arranged to be placed over magplate extension 249, as will be described below with reference to FIG. 4. Latching magnet 152 is typically a rare earth magnet. Rare earth magnets are preferred due to the high magnetic energy. While magnet nest 304 may be formed from any suitable material, in one embodiment, magnet nest 304 is preferably fabricated from injection molded plastic.

In general, a magplate of a disk drive assembly is formed from raw steel, as for example raw "cold rolled" steel. As will be appreciated by those skilled in the art, raw steel has magnetic properties which are well-suited for magnetic circuits. For example, the raw steel in magplate extension 249 attracts latching magnet 308 and enables latching magnet 308 to float without being completely unconstrained, e.g., loose. The raw steel in the magplate extension 249 also serves to shunt fringe fields from latching magnet 308.

A hammer 242, or actuator ferrite piece, is carried by an actuator body 230 that is, in turn, coupled to disk drive heads (not shown). In one embodiment, the actuator ferrite piece may be a magnet. Hammer 242 may be moved such that hammer 242 is attracted to latching magnet 308 and, hence, floating magnet latching piece 246. However, when hammer 242 comes into contact with floating magnet latching piece 246, most of the impact force that is generally associated with the impact of hammer 242 and floating magnet latching piece 246 is absorbed by a separate rubber bumper 254, or a rubber bumper 254 that is not directly coupled to latching magnet 308.

Rubber bumper 254 serves the purpose of being a "crash stop," or a force absorption medium, for actuator assembly 230. Rubber bumper 170 is preferably cylindrically shaped, although it should be appreciated that rubber bumper 254 may also take numerous other shapes, e.g., a spherical shape or any other substantially rounded shape. As rubber bumper 254 is generally of a cylindrical shape, e.g., rubber bumper 254 has a substantially circular cross-section, rubber bumper 254 is relatively easy to position with respect to the rotational axis of the disks (not shown) associated with actuator assembly 230, or any other fixed position within an overall disk drive assembly (not shown). That is, a cylindrically shaped piece is typically much easier to accurately position than a cubical piece, for example.

In general, rubber bumper 254 is formed from rubber which has good outgassing performance, i.e., is characterized by relatively little outgassing. Rubber that is characterized by relatively little outgassing is preferred as outgassing tends to create contamination within the disk drive which can have undesirable effects on the interface between a disk drive head and a disk. Suitable types of rubber include, but are not limited to, polyurethane, neoprene and EPDM rubber.

A crash stop contact point 230 that is located on actuator assembly 230 is arranged to contact rubber bumper 254 when disk drive heads (not shown) that are coupled to actuator assembly 230 are parked. As rubber bumper 254 is pliant, when crash stop contact point 230 contacts rubber bumper 254, rubber bumper 254 may be temporarily compressed. While contact is made between crash stop contact point 230 and rubber bumper 254, it should be appreciated that the positioning of floating magnet contact piece 246 is such that hammer 242 actually contacts magnet nest 304, rather than latching magnet 308. However, as latching magnet 308 is supported by magnet nest 304, any physical contact between hammer 242 and magnet nest 304 is essentially magnetic contact, i.e., a very small air gap, between hammer 242 and latching magnet 152. As magnet nest 304 and latching magnet 308 are arranged to "float," or to move, during a disk drive head parking process, the impact force between hammer 242 and magnet nest 304 is less than the impact force which would occur if magnet nest 304 and magnet 308 were rigidly mounted to magplate extension 249.

In general, magnet nest 304 and, hence, magnet 308 will move when hammer 242 contacts magnet nest 304. Hammer 162 is arranged to contact magnet nest 304 upon the initial impact between crash stop contact point 250 and rubber bumper 254. When crash stop contact point 250 "rebounds" from rubber bumper 254, e.g., when rubber bumper 254 is no longer compressed, actuator assembly 254 will typically cease movement. That is, actuator assembly 230 will come to a relatively gentle stop. At the same time, magnet nest 304 and magnet 308 will also typically come to rest. In the described embodiment, magnet nest 154 comes to rest against magplate extension 249.

It should be appreciated that the distance between magnet 308 and hammer 242 is generally considered to be an air gap. In other words, the thickness of the portion of magnet nest 304 that is placed between magplate extension 249 and magnet 308 defines the size of the air gap. The thickness of the portion of magnet nest 304 between magplate extension 249 and magnet 308 is arranged to absorb some of the impact force associated with latching actuator assembly 230 during a disk drive head parking process.

In general, rubber bumper 254 is arranged to absorb much of the impact force associated with latching actuator assembly 230 during a disk drive head parking process. As a result, the thickness of magnet nest 304 between magplate extension 249 and magnet 308 may be relatively small, as the impact force of hammer 242 on magnet nest 308 is typically small compared to the impact force of crash stop contact point 250 on rubber bumper 254. Therefore, as the thickness of magnet nest 304 between magplate extension 249 and magnet 308 is relatively small, it follows that the air gap is also relatively small. As such, the use of floating magnet latching piece 246 enables the magnetic holding force between magnet 308 and hammer 242 to be efficiently used.

Figure 2:
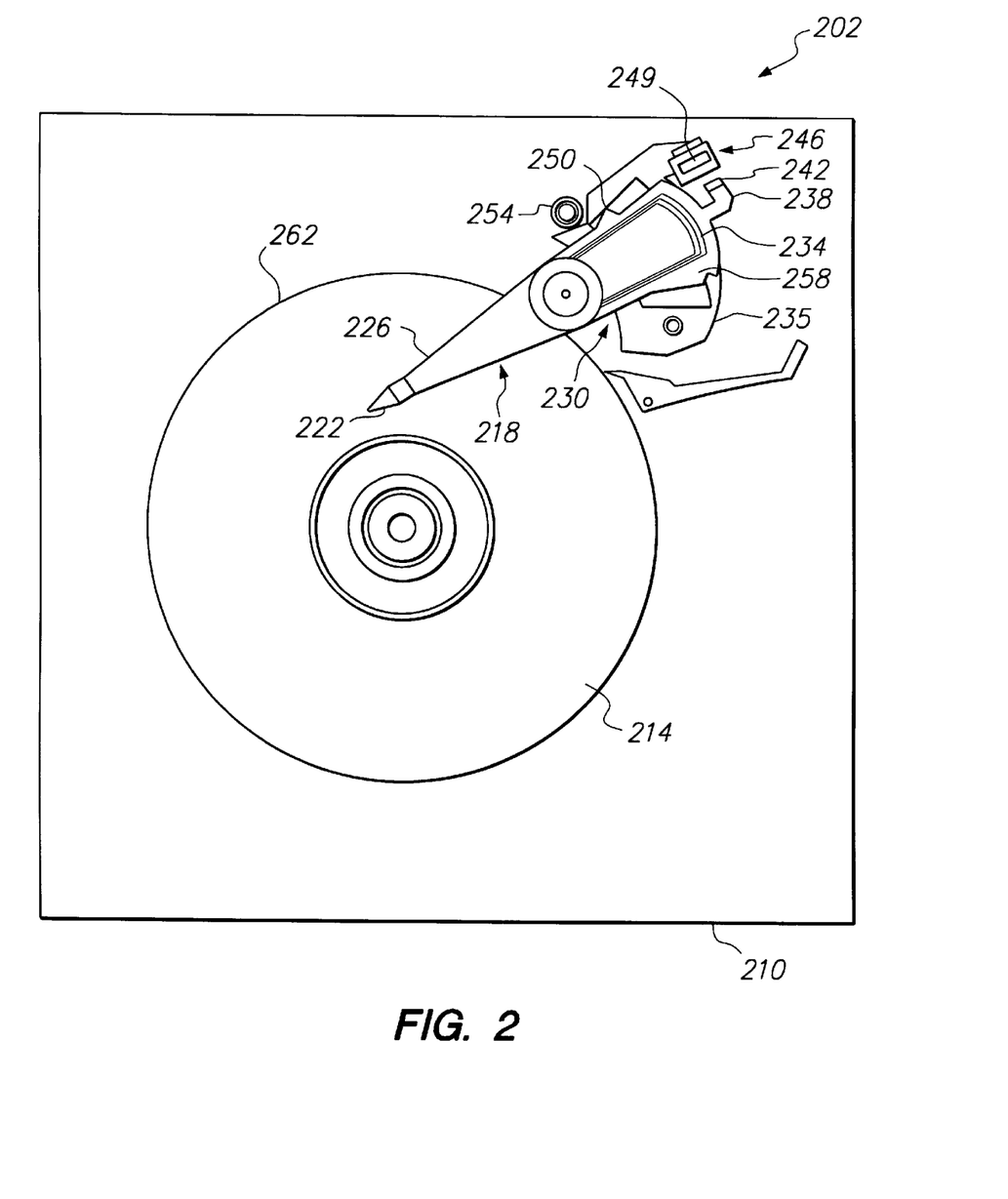
FIG. 2 is a diagrammatic representation of a disk drive which includes a floating magnet latching assembly, with the actuator assembly in an unlatched position in accordance with an embodiment of the present invention.

FIG. 2 is a diagrammatic representation of a disk drive which includes a floating magnet latching system, with the actuator assembly in an unlatched position in accordance with an embodiment of the present invention. A disk drive assembly 202 includes a base 210 on which a disk 214 is mounted. A disk drive head assembly 218, which is positioned over base 210, includes a disk drive head (not shown) mounted on a slider 222 that is located at the tip portion of head assembly 218. An extension block 226 of head assembly 218 is coupled to an actuator assembly 230, and is arranged to extend slider 222 over disk 214.

Actuator assembly 230 includes a coil assembly 234 through which current is flowed to facilitate the rotation of actuator assembly 230 in a particular direction. The direction in which current is flowed through coil assembly 234, in conjunction with a magnetic field produced between a lower magnetic plate assembly 235 and an upper magnetic plate assembly (not shown) which is situated over lower magnetic plate 235 and actuator assembly 230, determines the direction in which actuator assembly 230 pivots.

An encapsulation piece 238, which is located at an edge of actuator assembly 230, carries a ferrite hammer 242 that is arranged to engage a floating magnetic latch assembly 246, as will be described in more detail below with respect to FIGS. 3 and 4. As shown, ferrite hammer 242 and floating magnetic latch assembly 246 are not engaged, i.e., actuator assembly 230 is not latched. When floating magnetic latch assembly 246 is not engaged, floating magnetic latch assembly 246 is generally in a "rest" position, or a position in which floating magnetic latch assembly 246 is supported against a lower magnetic plate extension 249.

An inner diameter crash stop contact point 250 of actuator assembly 230 is arranged to contact an inner diameter bumper 254, or crash stop, which is positioned on base 210. Inner diameter crash stop contact point 250 comes into contact with bumper 254 during a disk drive head parking process, as was described above with respect to FIG. 1b. As shown, actuator assembly 230 is not latched. Hence, inner diameter crash stop contact point 250 is not in contact with bumper 254, which is preferably a cylindrically shaped rubber bumper.

In one described embodiment, an outer diameter crash stop contact point 258, which is on an opposite side of actuator assembly 230 with respect to inner diameter crash stop contact point 250, is arranged to contact an outer diameter crash stop (not shown) that is mounted on the upper magnetic plate (not shown) of disk drive assembly 202 when slider 222 is pivoted close to the edge 262 of disk 214. In other words, the outer diameter crash stop contact point is arranged to contact the outer diameter crash stop to prevent slider 222 from being placed at a location that is off of disk 214.

Figure 3:
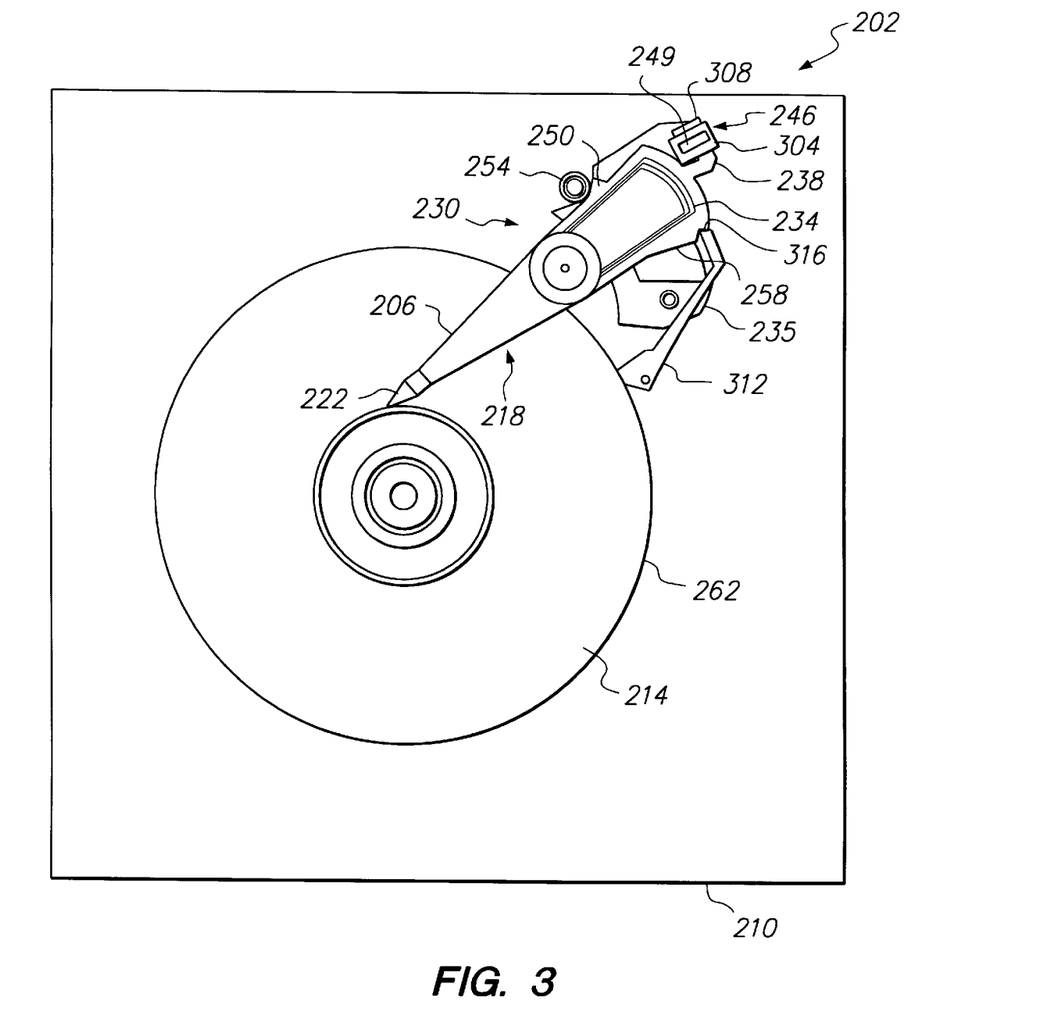
FIG. 3 is a diagrammatic representation of a disk drive which includes a floating magnet latching assembly, with the actuator assembly in a latched position in accordance with an embodiment of the present invention.

Referring next to FIG. 3, the disk drive assembly of FIG. 3, with the actuator assembly in a latched position, will be described in accordance with an embodiment of the present invention. Slider 222 is shown in a parked position, with inner diameter crash stop contact point 250 in contact with bumper 254. As previously described, when inner diameter crash stop contact point 250 initially makes contact with bumper 254, and hammer 242 first makes contact with floating magnet latch assembly 246, bumper 254 absorbs much of the impact force associated with the initial contact. Floating magnet latch assembly 246 or, more specifically, a magnet nest 304 that is a part of floating magnet latch assembly 246, absorbs a small amount of the impact force relative to the amount absorbed by bumper 254. It should be appreciated that in the described embodiment, as shown, bumper 254 is separate from floating magnet latch assembly 246. That is, bumper 254 is not directly coupled to floating magnet latch assembly 246 and, therefore, is not directly coupled to a floating latching magnet 308.

When hammer 242 makes contact with floating magnet latch assembly 246, floating magnet latch assembly 246 moves with respect to lower magnetic plate extension 249 which is arranged to support floating magnet latch assembly 246. That is, floating magnet latch assembly 246 "floats" and, therefore, the impact force between hammer 242 and floating magnet latch assembly 246 is substantially reduced as the floating magnet latch assembly 246 is able to dampen the impact force by moving with the hammer 242 upon initial impact.

As bumper 254 is separate from floating magnet latch assembly 246, the size of bumper 254 does not affect the air gap between hammer 242 and latch magnet 308. Thus, the size of bumper 254 does not affect the efficiency of the magnetic holding force between hammer 242 and floating magnet latch assembly 246, i.e., latch magnet 308. Accordingly, the size of bumper 254 may be varied without affecting the magnetic holding force. The size of bumper 254 is dependent upon the inertia associated with moving actuator assembly 230 and the crash velocity associated with actuator assembly 230. In general, an actuator assembly for a 5.25 inch form factor disk drive will require that bumper 254 be suitable for absorbing more force, or energy than required for a smaller form factor disk drive, or., an actuator assembly for either a 3.5 inch or a 2.5 inch disk drive. By way of example, a disk drive with a 5.25 inch disk may utilize a cylindrically shaped rubber bumper with an outer diameter of approximately eight millimeters and an inner diameter of approximately four millimeters, while a disk drive 3.5 inch disk may utilize a cylindrically shaped rubber bumper with an outer diameter of approximately six millimeters and an inner diameter of approximately two millimeters. Although the larger bumper 254 used for a larger diameter drive 202 may generally be used with a smaller diameter drive 202, in the interest of saving material and for ease of fabrication, the size of bumper 254 is usually scaled as appropriate.

After the initial impact between inner diameter crash stop contact point 250 and bumper 254, inner diameter crash stop contact point 250 rebounds from bumper 254, and floating magnet latch assembly 246 generally returns to a rest position against lower magnetic plate extension 249. When floating magnet latch assembly 246 is in a rest position, actuator assembly 218 will typically come to a gentle stop, and, hence, the disk drive head carried on slider 222 is effectively parked.

Disk drive assembly 202 is shown to further include an air lock 312 that is arranged to further prevent actuator assembly 230 and head assembly 218 from being susceptible to shocks, e.g., rotational shock inputs. Air lock 312 engages an air lock notch 316 in actuator assembly 230. In general, air lock 312 engages air lock notch 315 after hammer 242 impacts floating magnet latch assembly 246 and after disk 214 ceases spinning. It should be appreciated that in one embodiment, air lock 312, which is typically formed from an injection molded plastic, serves to protect against rotational shocks of a shorter duration while floating magnet latch assembly 246, when engaged to hammer 242, serves to protect against rotational shocks of a longer duration. Mechanical systems do not generally react to sharp, "short duration" shocks, e.g., air lock 312 would not typically move with shocks with a duration of less than approximately one millisecond. On the other hand, with longer duration shocks, air lock 312 may open, and actuator assembly 230 will typically try to move. However, due to the fact that the magnetic attraction force would still be in effect while hammer 242 is in the magnetic field associated with floating magnetic latch assembly 246, actuator assembly 230 will generally not move. Of course, other locking arrangements, other than air lock 312, may also be employed to secure actuator assembly 230, as will be appreciated by those skilled in the art.

Figure 4:
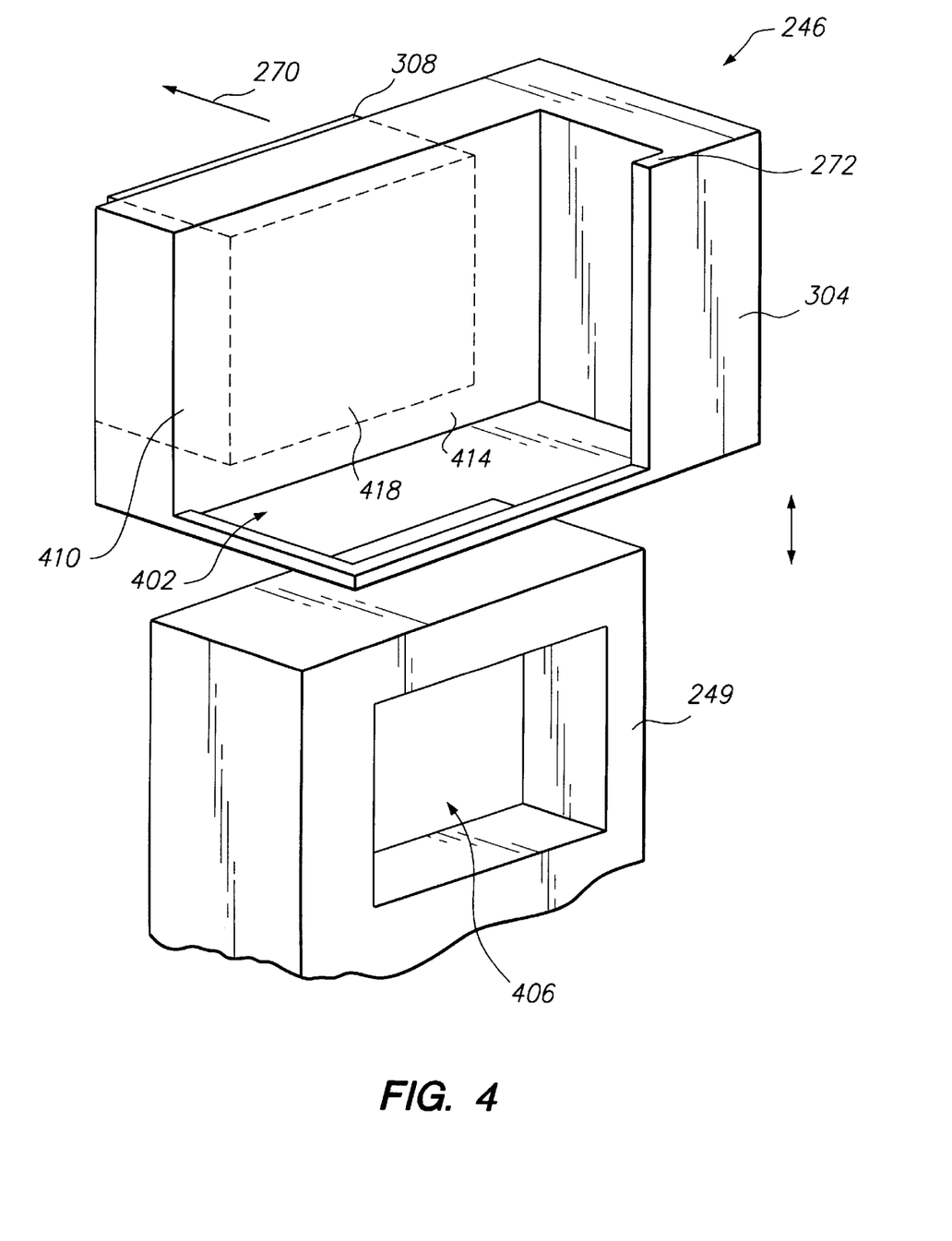
FIG. 4 is a diagrammatic representation of a floating magnet structure in accordance with an embodiment of the present invention.

With reference to FIG. 4, a floating magnet latch assembly will be described in accordance with an embodiment of the present invention. That is, floating magnetic latch assembly 246 of FIGS. 2 and 3 will be described. Floating magnetic latch assembly 246 includes magnet nest 304 and floating latching magnet 308. As previously mentioned, although magnet nest 304 may be formed from any suitable material, in one embodiment, magnet nest 304 is formed from an injection molded plastic. Typically, the size and the shape of an injection molded plastic part is relatively easy to control, e.g., the thickness of an injection molded plastic piece is readily controllable. Therefore, fabricating magnet nest 304 from injection molded plastic enables magnet nest 304 to be both efficiently and accurately formed.

Magnet nest 304 is arranged such that a hollow section 402 of magnet nest 304 may be situated over lower magnetic plate extension 249. In general, lower magnetic plate extension 249 at least partially supports magnet nest 304 and, therefore, floating latching magnet 308. That is, although not shown in FIG. 4, magnet nest 304 is placed over lower magnetic plate extension 249 such that magnet nest 304 is supported by lower magnetic plate extension 249.

Referring back to FIG. 2, magnetic plate extension 249 is integrally formed as part of lower magnetic plate assembly 235. As shown in FIG. 2, magnetic plate extension 249 extends along a plane substantially perpendicular to lower magnetic plate assembly 235.

As shown, latching magnet 308 is mounted on a back wall 410 of magnet nest 304. Specifically, latching magnet 308 is situated such that latching magnet 308 is partially embedded in back wall 410. When magnet nest 304 is in a "relaxed," or rest, position with respect to lower magnetic plate extension 249, back wall 410 is held in contact with lower magnetic plate extension 249 due to the magnetic attraction between lower magnetic plate extension 249 and latching magnet 308. In general, the air gap between latching magnet 308 and lower magnetic plate extension 249, as described above, corresponds to the thickness of back wall 410 between a first surface 414 of back wall 410 and an embedded surface 418 of latching magnet 308.

It should be appreciated that hollow section 402 of magnet nest 304 is sized such that magnet nest 304 may be moved when magnet nest 304 is placed over lower magnetic plate extension 249. When a hammer associated with an actuator assembly (not shown) passes through an opening 406 in lower magnetic plate extension 249 and contacts back wall 410 of magnet nest 304, the impact of the contact may cause magnet nest 304 to move with respect to lower magnetic plate extension 249. That is, the magnet nest 304 may be moved in the direction indicated by arrow 270 from a relaxed position upon impact of a hammer (not shown) with back wall 410. The movement is constrained by structure 272, which prevents magnet nest 304 from "popping off" lower magnetic plate extension 249. This movement against the attractive magnetic force between latching magnet 308 and lower magnetic plate extension 249 reduces the impact force on back wall 410 to a lower magnitude than would be experienced by back wall 410 if magnet nest 304 were not arranged to float, as will be appreciated by those skilled in the art. Of course, the brunt of the impact has already been absorbed by bumper 254 of FIGS. 2 and 3, as previously discussed. Typically, after the initial contact between a hammer and back wall 410, magnet nest 304 will be returned to a rest position, i.e., the attractive magnetic force will urge back wall 410 against lower magnetic plate extension 249 at rest.

Although only a few embodiments of the present invention have been described, it should be understood that the present invention may be embodied in many other specific forms without departing from the spirit or the scope of the present invention. By way of example, the location of the floating latching magnet assembly and the crash stop may be widely varied. That is, the orientation of the floating latching magnet assembly, as well as a corresponding crash stop, within a disk drive assembly may be varied to compensate for space constraints within the disk drive assembly. Accordingly, the hammer and the crash stop contact point on an associated actuator assembly may also be varied without departing from the spirit or the scope of the present invention.

It should be appreciated that any suitable method may be used to release a disk drive head from a parked position. By way of example, in order to pull the actuator assembly away from the floating latching magnet assembly, current may be run through the coil associated with the actuator assembly in a direction which is appropriate for pulling the actuator assembly away from the floating latching magnet assembly.

As described above, the floating latching magnet assembly generally includes a latching magnet and a magnet nest. However, in some embodiments, floating latching magnet assembly may also include an additional surface which is arranged to absorb the force or energy associated with the impact of a hammer against the floating latching magnet assembly. For example, the additional surface may include a thin rubber pad that is arranged to further "cushion" the impact of the hammer against the floating latching magnet assembly.

Although a floating latching magnet has been described as being supported by a magnet nest, it should be appreciated a floating latching magnet may be supported by any suitable structure. For example, a floating latching magnet may be supported by a spring-like structure that is arranged to constrain the movement of the floating latching magnet with respect to a magplate or similar structure. Therefore, the present examples are to be considered as illustrative and not restrictive, and the invention is not to be limited to the details given herein, but may be modified within the scope of the appended claims.

We claim:

1. A disk drive apparatus comprising:

a base plate;

a disk coupled to the base plate a disk drive head assembly arranged over the disk;

an actuator assembly arranged to position the disk drive head assembly over the disk, the actuator assembly being coupled to the disk drive head assembly, wherein the actuator assembly includes a ferrite piece; and a plate extension coupled to the base plate;

a movable magnetic latching assembly, the movable magnetic latching assembly being arranged to move with respect to the base plate, wherein the movable magnetic latching assembly is further arranged to attract the ferrite piece towards and into contact with the magnetic latching assembly when the disk drive head assembly is positioned in a parking position, the magnetic latching assembly further being arranged to move with the magnetic latching assembly when the ferrite piece first contacts the magnetic latching assembly comprising:

a magnet nest movably mounted over the plate extension;

a latch magnet coupled to the magnet nest wherein the latch magnet is arranged to attract the plate extention and the ferrite piece.

2. The apparatus of claim 1 wherein the actuator assembly includes a crash stop contact point, the crash stop contact point being positioned away from the ferrite piece.

3. The apparatus of claim 2 further including a crash stop coupled to the base plate and arranged to be contacted by the crash stop contact point when the disk drive head assembly is positioned in the parking position.

4. The apparatus of claim 3 wherein the ferrite piece and the magnet nest are arranged such that an impact between the ferrite piece and the magnet nest is absorbed by a combination of a displacement of the magnet nest in a direction away from the plate extension and a compression of the crash stop.

5. The apparatus of claim 1 further including an air lock arranged to prevent the disk drive head assembly from being susceptible to shocks.

6. The apparatus of claim 5 wherein the air lock for preventing the actuator assembly from being susceptible to shocks is arranged to prevent the actuator assembly from being susceptible to shocks when the actuator assembly is in the parking position.

7. A method for assembling a disk drive comprising:

providing a base plate;

coupling a disk to the base plate;

coupling an actuator assembly to the base plate, the actuator assembly being coupled to a disk drive head assembly and arranged to position the disk drive head assembly over the disk, wherein the actuator assembly includes a ferrite piece and a crash stop contact point, the crash stop contact point being separate from the ferrite piece;

coupling a magnetic latching assembly to the base plate, the magnetic latching assembly including a latch magnet, wherein the latch magnet is movably coupled to the base plate and is arranged to attract the ferrite piece;

providing a magnet nest arranged to support the latch magnet;

coupling the latch magnet to the magnet nest;

movably coupling the magnet nest to the base plate; and coupling a compressible crash stop to the base plate, the compressible crash stop being arranged to be contacted by the crash stop contact point when the disk drive head assembly is positioned in a parking position, wherein the ferrite piece is attracted towards the latch magnet when the disk drive assembly is positioned in the parking position and wherein the ferrite piece moves with the latch magnet when the ferrite piece first contacts the latch magnet.

8. The method for assembling a disk drive as recited in claim 7 further including:

coupling a plate extension to the base plate; and locating the magnet nest over the plate extension, the magnet nest being movably and magnetically supported by the plate extension.

9. The method for assembling a disk drive as recited in claim 8 further including arranging the magnet nest to move with respect to the plate extension when the ferrite piece first contacts the magnet nest.

10. The method for assembling a disk drive as recited in claim 7 further including:

providing an air lock; and coupling the air lock to the base plate, wherein the air lock is arranged to engage the actuator assembly to prevent the actuator assembly from being susceptible to shocks.

* * * * *